(12) United States Patent
Ren et al.

(10) Patent No.: US 10,936,298 B2
(45) Date of Patent: Mar. 2, 2021

(54) SYSTEMS AND METHODS FOR UPDATING AND LOADING AN APPLICATION

(71) Applicant: BEIJING DIDI INFINITY TECHNOLOGY AND DEVELOPMENT CO., LTD., Beijing (CN)

(72) Inventors: Yugang Ren, Beijing (CN); Hai Wang, Beijing (CN); Tao Zheng, Beijing (CN)

(73) Assignee: BEIJING DIDI INFINITY TECHNOLOGY AND DEVELOPMENT CO., LTD., Beijing (CN)

( * ) Notice: Subject to any disclaimer, the term of this patent is extended or adjusted under 35 U.S.C. 154(b) by 0 days.

(21) Appl. No.: 16/729,261

(22) Filed: Dec. 27, 2019

(65) Prior Publication Data

US 2020/0167146 A1 May 28, 2020

Related U.S. Application Data

(63) Continuation of application No. PCT/CN2017/110914, filed on Nov. 14, 2017.

(30) Foreign Application Priority Data

Jun. 28, 2017 (CN) .......................... 201710509998.1

(51) Int. Cl.
*G06F 8/65* (2018.01)
*G06F 9/445* (2018.01)

(52) U.S. Cl.
CPC ............ *G06F 8/65* (2013.01); *G06F 9/44526* (2013.01)

(58) Field of Classification Search
None
See application file for complete search history.

(56) References Cited

U.S. PATENT DOCUMENTS

2002/0188625 A1   12/2002   Jans et al.
2005/0097574 A1*   5/2005   Morrison .................. G06F 8/38
                                                            719/328

(Continued)

FOREIGN PATENT DOCUMENTS

CN        102843342 A     12/2012
CN        103544058 A      1/2014

(Continued)

OTHER PUBLICATIONS

International Search Report in PCT/CN2017/110914 dated Mar. 23, 2018, 4 pages.

(Continued)

*Primary Examiner* — Qing Chen
(74) *Attorney, Agent, or Firm* — Metis IP LLC

(57) ABSTRACT

The present disclosure relates to systems and methods for updating and loading an application installed in a terminal device. The system may perform the methods to transmit an update notice of the application to the mobile device; and provide a resource installation package to the mobile device upon a response from the mobile device to the update notice. The application includes a shell and a pre-update plugin, and the shell includes a plugin engine. The resource installation package is configured to direct the application to use the plugin engine in the shell to utilize components of the resource installation package to update the pre-update plugin without attaining approval from an application store platform.

17 Claims, 10 Drawing Sheets

(56) References Cited

U.S. PATENT DOCUMENTS

| | | | | |
|---|---|---|---|---|
| 2009/0287559 A1* | 11/2009 | Chen | ............ | G06Q 30/0253 |
| | | | | 705/14.23 |
| 2010/0257539 A1* | 10/2010 | Narayanan | ............ | G06F 9/54 |
| | | | | 719/311 |
| 2012/0296959 A1* | 11/2012 | Momchilov | ............ | G06F 9/54 |
| | | | | 709/203 |
| 2014/0359604 A1* | 12/2014 | Salameh | ............ | G06F 8/60 |
| | | | | 717/177 |
| 2015/0172228 A1* | 6/2015 | Zalepa | ............ | H04L 12/1813 |
| | | | | 709/206 |

FOREIGN PATENT DOCUMENTS

| | | |
|---|---|---|
| CN | 103577415 A | 2/2014 |
| CN | 105187943 A | 12/2015 |
| CN | 105468395 A | 4/2016 |
| CN | 106648559 A | 5/2017 |
| CN | 107273142 A | 10/2017 |
| EP | 2482187 A1 | 8/2012 |

OTHER PUBLICATIONS

Written Opinion in PCT/CN2017/110914 dated Mar. 23, 2018, 4 pages.
Yugang Ren, VirtualAPK: Didi Android plug-in practice road, Chinese Software Developer Network, 2016, 15 pages.
First Office Action in Chinese Application No. 201710509998.1 dated Mar. 19, 2020, 16 pages.
Extended European Search Report in European Application No. 17915568.4 dated Jun. 5, 2020, 9 pages.
The essence of seven QCon speeches by eight Didi engineers, http://it.people.com.cn/n1/2017/0419/c1009-29222560.html, People's Daily Online-IT Channel, 20 Pages.
Second Office Action in Chinese Application No. 201710509998.1 dated Nov. 3, 2020, 16 Pages.

* cited by examiner

700

```
┌─────────────────────────────────────┐
│ Transmitting an update notice of an │   710
│ application to a mobile device, the │
│ application includes a shell and a  │
│ pre-update plugin, and the shell    │
│ includes a plugin engine            │
└─────────────────────────────────────┘
                  ↓
┌─────────────────────────────────────┐
│ Providing a resource installation   │   720
│ package to the mobile device upon a │
│ response from the mobile device to  │
│ the update notice, the resource     │
│ installation package is configured  │
│ to direct the application to use    │
│ the plugin engine in the shell to   │
│ utilize the components of the       │
│ resource installation package to    │
│ update the pre-update plugin        │
│ without attaining approval from an  │
│ application store platform          │
└─────────────────────────────────────┘
```

FIG. 7

SYSTEMS AND METHODS FOR UPDATING AND LOADING AN APPLICATION

CROSS-REFERENCE TO RELATED APPLICATIONS

This application is a continuation of International Application No. PCT/CN2017/110914, filed on Nov. 14, 2017, which claims priority to Chinese Patent Application No. 201710509998.1 filed on Jun. 28, 2017, the contents of which are incorporated herein by reference.

TECHNICAL FIELD

The present disclosure generally relates to mobile applications, and in particular, systems and methods for updating an application installed in a mobile device.

BACKGROUND

With the increasing popularity of mobile applications, maintenance and upgrading activities (e.g., modifying a user interface) of the mobile applications have become more and more frequent and important. Updating a mobile application, especially updating a mobile application in an ANDROID system, has been crucial to the proper functioning and improvement of mobile applications. With the existing technology, when a developer wants to update an application, the developer would first upload a new version of the application onto an application store platform. Then the application store platform releases the new version to users after reviewing the new version. In addition, the users can only update the application by downloading the new version manually from the application store platform. A problem of this approach is that it often takes a long time for the user to realize that a new version of the application is available after the developer uploads the new version. Another problem is that the users often need to download the new version of the application manually using mobile traffic. Accordingly, it is desirable to provide systems and methods for updating the mobile applications automatically and efficiently.

SUMMARY

According to an aspect of the present disclosure, a system is provided. The system may include at least one computer-readable storage medium, and at least one processor in communication with the at least one computer-readable storage medium. The at least one computer-readable storage medium may include a set of instructions for updating and loading an application installed in a mobile device. When the at least one processor executes the set of instructions, the at least one processor may be directed to: transmit an update notice of the application to the mobile device, the application includes a shell and a pre-update plugin, and the shell includes a plugin engine; and provide a resource installation package to the mobile device upon a response from the mobile device to the update notice. The resource installation package may be configured to direct the application to use the plugin engine in the shell to utilize components of the resource installation package to update the pre-update plugin. In some embodiments, the application is updated without attaining approval from an application store platform.

In some embodiments, the resource installation package may direct the application to receive a pre-update resource bundle in the pre-update plugin, the pre-update resource bundle has a bundle identification (ID), a resource type and a resource number; identify a corresponding update resource bundle in the resource installation package, the update resource bundle has a same resource type and a same resource number as the pre-update resource bundle; modify the bundle ID of the update resource bundle to be the same as the bundle ID of the pre-update resource bundle; and integrate the update resource bundle whose bundle ID is modified into the application.

In some embodiments, the resource installation package may direct the application to use the plugin engine to intercept activating the pre-update plugin; direct a uniform resource identifier (URI) of the pre-update plugin to a URI of a proxy plugin; store the URI of the pre-update plugin in the URI of the proxy plugin; parse the URI of the pre-update plugin in the proxy plugin; and create an updated plugin based on the parsed URI.

In some embodiments, the resource installation package may direct the application to receive an external request from a user; transmit the external request to the updated plugin via the proxy plugin; determine a response to the external request; transmit the response to the proxy plugin via the updated plugin; and present the response to the external request via the proxy plugin.

In some embodiments, the resource installation package may direct the application to invoke a lifecycle of the updated plugin in a user interface thread.

In some embodiments, the at least one processor may further the resource installation package. The resource installation package includes at least one update resource bundle.

In some embodiments, each update resource bundle includes a bundle ID, a resource type and a resource number.

According to another aspect of the present disclosure, a method for updating and loading an application installed in a mobile device is provided. The method may include one or more of the following operations: transmitting an update notice of the application to the mobile device, wherein the application includes a shell and a pre-update plugin, and wherein the shell includes a plugin engine; providing a resource installation package to the mobile device upon a response from the mobile device to the update notice, wherein the resource installation package is configured to direct the application to use the plugin engine in the shell to utilize components of the resource installation package to update the pre-update plugin. In some embodiments, the application is updated without attaining approval from an application store platform.

In some embodiments, the resource installation package may be configured to direct the application to: receive a pre-update resource bundle in the pre-update plugin, wherein the pre-update resource bundle has a bundle identification (ID), a resource type and a resource number; identify a corresponding update resource bundle in the resource installation package, wherein the update resource bundle has a same resource type and a same resource number as the pre-update resource bundle; modify the bundle ID of the update resource bundle to be the same as the bundle ID of the pre-update resource bundle; and integrate the update resource bundle whose bundle ID is modified into the application.

In some embodiments, the resource installation package may be configured to direct the application to: use the plugin engine to intercept activating the pre-update plugin; direct a uniform resource identifier (URI) of the pre-update plugin to a URI of a proxy plugin; store the URI of the pre-update plugin in the URI of the proxy plugin; parse the URI of the pre-update plugin in the proxy plugin; and create an updated plugin based on the parsed URI.

In some embodiments, the resource installation package may be configured to direct the application to: receive an external request from a user; transmit the external request to the updated plugin via the proxy plugin; determine a response to the external request; transmit the response to the proxy plugin via the updated plugin; and present the response to the external request via the proxy plugin.

In some embodiments, the resource installation package may be configured to direct the application to: invoke a lifecycle of the updated plugin in a user interface thread.

In some embodiments, the method may further include creating the resource installation package, wherein the resource installation package includes at least one update resource bundle.

In some embodiments, each update resource bundle may include a bundle ID, a resource type and a resource number.

According to still another aspect of the present disclosure, a non-transitory computer readable medium, comprising at least one set of instructions for updating and loading an application installed in a mobile device, wherein when executed by at least one processor of a computer device, the at least one set of instructions directs the at least one processor to: transmit an update notice of the application to the mobile device, the application includes a shell and a pre-update plugin, and the shell includes a plugin engine; and provide a resource installation package to the mobile device upon a response from the mobile device to the update notice. The resource installation package may be configured to direct the application to use the plugin engine in the shell to utilize components of the resource installation package to update the pre-update plugin. In some embodiments, the resource installation package may be configured to update the application without attaining approval from an application store platform.

Additional features will be set forth in part in the description which follows, and in part will become apparent to those skilled in the art upon examination of the following and the accompanying drawings or may be learned by production or operation of the examples. The features of the present disclosure may be realized and attained by practice or use of various aspects of the methodologies, instrumentalities and combinations set forth in the detailed examples discussed below.

BRIEF DESCRIPTION OF THE DRAWINGS

The present disclosure is further described in terms of exemplary embodiments. These exemplary embodiments are described in detail with reference to the drawings. These embodiments are non-limiting exemplary embodiments, in which like reference numerals represent similar structures throughout the several views of the drawings, and wherein:

FIG. 7 is a flowchart illustrating an exemplary process for updating and loading an application installed in a mobile device according to some embodiments of the present disclosure;

DETAILED DESCRIPTION

The following description is presented to enable any person skilled in the art to make and use the present disclosure, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present disclosure is not limited to the embodiments shown, but is to be accorded the widest scope consistent with the claims.

The terminology used herein is for the purpose of describing particular example embodiments only and is not intended to be limiting. As used herein, the singular forms "a," "an," and "the" may be intended to include the plural forms as well, unless the context clearly indicates otherwise. It will be further understood that the terms "comprise," "comprises," and/or "comprising," "include," "includes," and/or "including," when used in this specification, specify the presence of stated features, integers, steps, operations, elements, and/or components, but do not preclude the presence or addition of one or more other features, integers, steps, operations, elements, components, and/or groups thereof.

Figure 2:
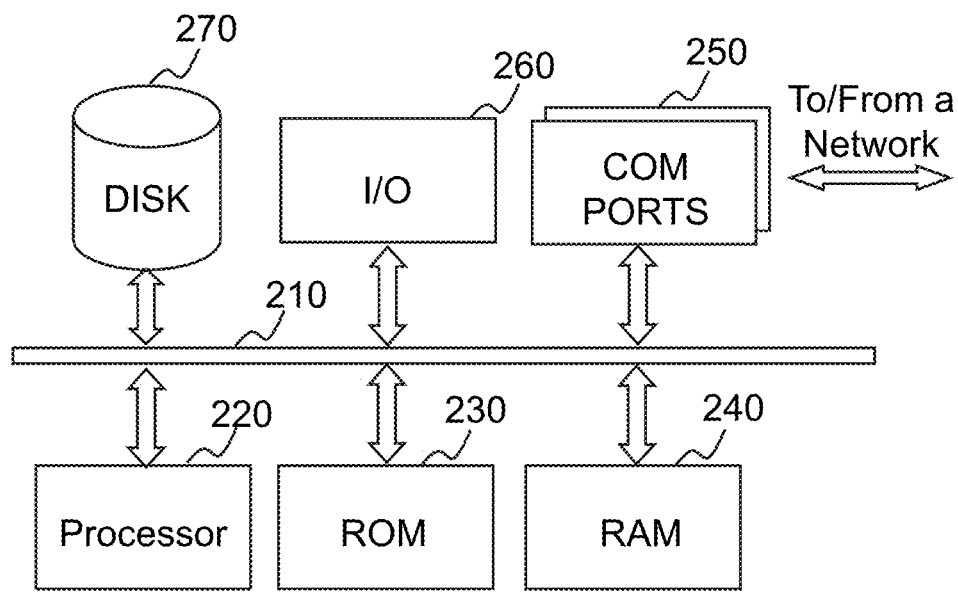
FIG. 2 is a schematic diagram illustrating exemplary hardware and/or software components of an exemplary computing device according to some embodiments of the present disclosure.

Generally, the word "module" or "unit" as used herein, refers to logic embodied in hardware or firmware, or to a collection of software instructions. A module or a unit described herein may be implemented as software and/or hardware and may be stored in any type of non-transitory computer-readable medium or other storage device. In some embodiments, a software module/unit may be compiled and linked into an executable program. It will be appreciated that software modules can be callable from other modules/units or from themselves, and/or may be invoked in response to detected events or interrupts. Software modules/units configured for execution on computing devices (e.g., processor 210 as illustrated in FIG. 2) may be provided on a computer-readable medium, such as a compact disc, a digital video disc, a flash drive, a magnetic disc, or any other tangible medium, or as a digital download (and can be originally stored in a compressed or installable format that needs installation, decompression, or decryption prior to execution). Such software code may be stored, partially or fully, on a storage device of the executing computing device, for execution by the computing device. Software instructions may be embedded in a firmware, such as an EPROM. It will be further appreciated that hardware modules/units may be included in connected logic components, such as gates and flip-flops, and/or can be included of programmable units, such as programmable gate arrays or processors. The modules/units or computing device functionality described herein may be implemented as software modules/units, but may be represented in hardware or firmware. In general, the modules/units described herein refer to logical modules/units that may be combined with other modules/units or divided into sub-modules/sub-units despite their physical organization or storage. The description may be applicable to a system, an engine, or a portion thereof.

These and other features, and characteristics of the present disclosure, as well as the methods of operation and functions of the related elements of structure and the combination of parts and economies of manufacture, may become more apparent upon consideration of the following description with reference to the accompanying drawings, all of which form a part of this disclosure. It is to be expressly understood, however, that the drawings are for the purpose of illustration and description only and are not intended to limit the scope of the present disclosure. It is understood that the drawings are not to scale.

The flowcharts used in the present disclosure illustrate operations that systems implement according to some embodiments of the present disclosure. It is to be expressly understood, the operations of the flowchart may be implemented not in order. Conversely, the operations may be implemented in inverted order, or simultaneously. Moreover, one or more other operations may be added to the flowcharts. One or more operations may be removed from the flowcharts.

Moreover, while the systems and methods in the present disclosure are described primarily regarding updating and loading an application installed in a mobile device, it should also be understood that this is only one exemplary embodiment. The systems and methods of the present disclosure may be applied to any other kind of applications. For example, the systems and methods of the present disclosure may be applied to applications installed in a computer, applications installed in a pad, applications installed in a smart electronic device, applications installed in an artificial intelligence robot, or the like, or any combination thereof. An application may refer to a program designed to perform functions, tasks, or activities for users. The application may include an office application, a download application, a communication application, a business application, a multimedia application, an online on-demand service application, a game application, a browsing application, or the like, or any combination thereof.

An aspect of the present disclosure relates to systems and methods for updating and loading an application installed in a mobile device. According to the present disclosure, the systems and methods may identify a shell and a core-business plugin in an application, the shell includes a plugin engine. Here, the term "core-business" refers to the application's functions or services that are designed to serve the user. The systems and method may use a resource installation package to update the resource in the core-business plugin, and use the plugin engine in the shell to load the updated core-business plugin. The systems and methods may implement the process of updating and loading the application automatically without attaining approval from an application store platform. For example, according to some embodiments of the present invention, the User Interface (UI) resources in an ANDROID application may be modified without approval from any application store platform. When the application uses plugins according to the present invention, there is no loss of resolution or functionality compared with using internal resources. Moreover, the modifications are transparent to the developers of the applications, who does not need to conduct further adaptations in addition to the change of the UI.

Figure 1:
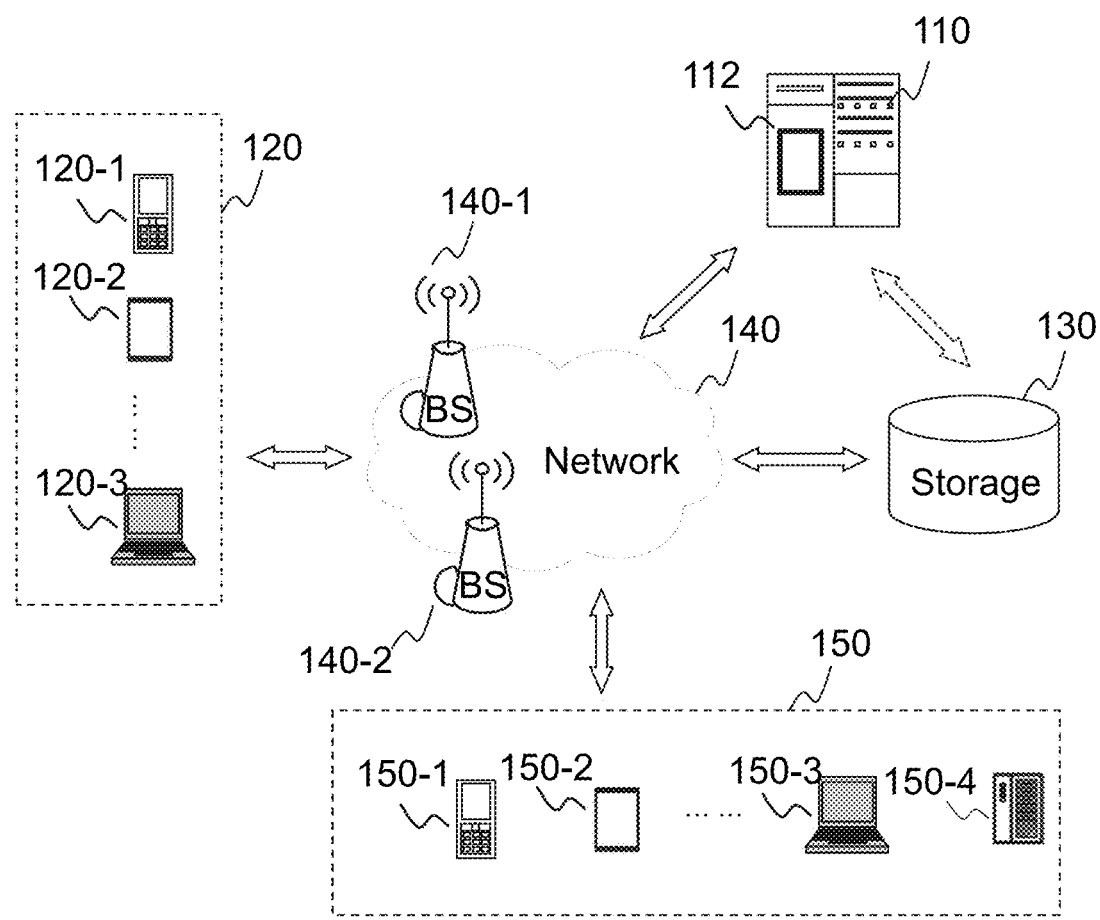
FIG. 1 is a schematic diagram illustrating an exemplary system for updating and loading an application according to some embodiments of the present disclosure.

FIG. 1 is a schematic diagram illustrating an exemplary system 100 for updating and loading an application according to some embodiments of the present disclosure. For example, the system 100 may be an ANDROID application platform for providing applications for mobile devices. The system 100 may include a server 110, an ANDROID terminal 120, a storage 130, a network 140, and an application operator terminal 150. The server 110 may include a processing engine 112.

The server 110 may be configured to process data and/or information relating to an application update. For example, the server 110 may receive a new version of the application, and transmit the new version of the application to at least one mobile device. In some embodiments, the server 110 may be a single server or a server group. The server group may be centralized, or distributed (e.g., the server 110 may be a distributed system). In some embodiments, the server 110 may be local or remote. For example, the server 110 may access information and/or data stored in the ANDROID terminal 120, the application operator terminal 150 and/or the storage 130 via the network 140. As another example, the server 110 may be directly connected to the ANDROID terminal 120, the application operator terminal 150 and/or the storage 130 to access stored information and/or data. In some embodiments, the server 110 may be implemented on a cloud platform. Merely by way of example, the cloud platform may include a private cloud, a public cloud, a hybrid cloud, a community cloud, a distributed cloud, an inter-cloud, a multi-cloud, or the like, or any combination thereof. In some embodiments, the server 110 may be implemented on a computing device 200 having one or more components illustrated in FIG. 2 in the present disclosure.

In some embodiments, the server 110 may include a processing engine 112. The processing engine 112 may process information and/or data relating to the application update to perform one or more functions described in the present disclosure. For example, the processing engine 112 may transmit an update notice of the application to a mobile device, and provide a resource installation package to the mobile device upon a response form the mobile device to the update notice. In some embodiments, the processing engine 112 may include one or more processing engines (e.g., single-core processing engine(s) or multi-core processor(s)). Merely by way of example, the processing engine 112 may include a central processing unit (CPU), an application-specific integrated circuit (ASIC), an application-specific instruction-set processor (ASIP), a graphics processing unit (GPU), a physics processing unit (PPU), a digital signal processor (DSP), a field programmable gate array (FPGA), a programmable logic device (PLD), a controller, a microcontroller unit, a reduced instruction-set computer (RISC), a microprocessor, or the like, or any combination thereof.

The network 140 may facilitate the exchange of information and/or data. In some embodiments, one or more components in the system 100 (e.g., the server 110, the ANDROID terminal 120, the application operator terminal 150, and the storage 130, etc.) may send information and/or data to other component(s) in the system 100 via the network 140. For example, the server 110 may obtain/acquire data flow from the ANDROID terminal 120 and/or the application operator terminal 150 via the network 140. In some embodiments, the network 140 may be any type of wired or wireless network, or a combination thereof. Merely by way of example, the network 140 may include a cable network, a wireline network, an optical fiber network, a telecommunications network, an intranet, an Internet, a local area network (LAN), a wide area network (WAN), a wireless local area network (WLAN), a metropolitan area network (MAN), a wide area network (WAN), a public telephone switched network (PSTN), a Bluetooth network, a ZigBee network, a near field communication (NFC) network, or the like, or any combination thereof. In some embodiments, the network 140 may include one or more network access points. For example, the network 140 may include wired or wireless network access points such as base stations and/or internet exchange points 140-1, 140-2 . . . , through which one or more components of the data uploading system 100 may be connected to the network 140 to exchange data and/or information.

The ANDROID terminal 120 may refer to a terminal with an ANDROID operation system. The ANDROID terminal 120 may include a plurality of applications installed therein. For example, the ANDROID terminal 120 may be a smart phone, a PDA, a tablet computer, etc. The application operator terminal 150 may refer to a terminal that is used by an application operator or an application developer to manage and/or update the application. In some embodiments, the application operator terminal 150 may be the same or similar type as the ANDROID terminal 120. For example, the application operator may use a smart phone, a tablet computer, a built-in device in a motor vehicle, a laptop computer, a desktop computer etc., as the ANDROID terminal 120 to facilitate the manage and/or update the applications.

In some embodiments, the ANDROID terminal 120 may include a mobile device 120-1, a tablet computer 120-2, a laptop computer 120-3, or the like, or any combination thereof. In some embodiments, the mobile device 120-1 may include a smart home device, a wearable device, a mobile device, a virtual reality device, an augmented reality device, a build-in device, or the like, or any combination thereof. In some embodiments, the smart home device may include a smart lighting device, a control device of an intelligent electrical apparatus, a smart monitoring device, a smart television, a smart video camera, an interphone, or the like, or any combination thereof. In some embodiments, the wearable device may include a bracelet, footgear, glasses, a helmet, a watch, clothing, a backpack, a smart accessory, or the like, or any combination thereof. In some embodiments, the mobile device may include a mobile phone, a personal digital assistance (PDA), a gaming device, a navigation device, a travelling data recorder, a point of sale (POS) device, a laptop, a desktop, or the like, or any combination thereof. In some embodiments, the virtual reality device and/or the augmented reality device may include a virtual reality helmet, a virtual reality glass, a virtual reality patch, an augmented reality helmet, augmented reality glasses, an augmented reality patch, or the like, or any combination thereof. For example, the virtual reality device and/or the augmented reality device may include a Google Glass™, an Oculus Rift™, a Hololens™, a Gear VR™, etc. In some embodiments, the build-in device may refer to a device embedded in a vehicle. For example, the build-in device may include an onboard computer, an onboard television, an onboard telephone, an onboard navigation device, an onboard travelling data recorder, or the like, or any combination thereof.

The storage 130 may store data and/or instructions relating to the application update. In some embodiments, the storage 130 may store data obtained from the ANDROID terminal 120 or the application operator terminal 150. In some embodiments, the storage 130 may store data and/or instructions that the server 110 may execute or use to perform exemplary methods described in the present disclosure. In some embodiments, the storage 130 may include a mass storage, a removable storage, a volatile read-and-write memory, a read-only memory (ROM), or the like, or any combination thereof. Exemplary mass storage may include a magnetic disk, an optical disk, a solid-state drive, etc. Exemplary removable storage may include a flash drive, a floppy disk, an optical disk, a memory card, a zip disk, a magnetic tape, etc. Exemplary volatile read-and-write memory may include a random access memory (RAM). Exemplary RAM may include a dynamic RAM (DRAM), a double date rate synchronous dynamic RAM (DDR SDRAM), a static RAM (SRAM), a thyrisor RAM (T-RAM), and a zero-capacitor RAM (Z-RAM), etc. Exemplary ROM may include a mask ROM (MROM), a programmable ROM (PROM), an erasable programmable ROM (EPROM), an electrically-erasable programmable ROM (EEPROM), a compact disk ROM (CD-ROM), and a digital versatile disk ROM, etc. In some embodiments, the storage 130 may be implemented on a cloud platform. Merely by way of example, the cloud platform may include a private cloud, a public cloud, a hybrid cloud, a community cloud, a distributed cloud, an inter-cloud, a multi-cloud, or the like, or any combination thereof.

In some embodiments, the storage 130 may be connected to the network 140 to communicate with one or more components in the system 100 (e.g., the server 110, the ANDROID terminal 120, the application operator terminal 150, etc.). One or more components in the system 100 may access the data or instructions stored in the storage 130 via the network 140. In some embodiments, the storage 130 may be directly connected to or communicate with one or more components in the system 100 (e.g., the server 110, the ANDROID terminal 120, the application operator terminal 150, etc.). In some embodiments, the storage 130 may be part of the server 110.

In some embodiments, one or more components in the system 100 (e.g., the server 110, the ANDROID terminal 120, the application operator terminal 150, etc.) may have permission to access the storage 130. In some embodiments, one or more components in the system 100 may read and/or parse information relating to the applications when one or more conditions are met. For example, the server 110 may obtain information relating to one or more applications (e.g., new versions of the one or more applications, etc.) from the application operator terminal 150 when the application operator terminal 150 update the one or more applications. And the server 110 may provide the information relating to the one or more applications to the ANDROID terminal 120.

FIG. 2 is a schematic diagram illustrating exemplary hardware and software components of an exemplary computing device on which the server 110, the ANDROID terminal 120, the application operator terminal 150, and/or the storage 130 may be implemented according to some embodiments of the present disclosure. For example, the server 110 may be implemented on the computing device 200 and configured to perform functions of the server 110 disclosed in the present disclosure.

The computing device 200 may be a general-purpose computer or a special-purpose computer. Both types may be configured to implement any particular system according to some embodiments of the present disclosure. The computing device 200 may be configured to implement one or more functions disclosed in the present disclosure. For example, the server 110 may be implemented on the computing device 200, via its hardware, software program, firmware, or a combination thereof. Although only one such computer is shown, for convenience, the computer functions relating to updating and loading an application as described herein may be implemented in a distributed fashion on a number of similar platforms, to distribute the processing load.

The computing device 200, for example, may include COM ports 240 connected to and from a network connected thereto to facilitate data communications. The computing device 200 may also include a processor 210, for executing program instructions. The computing device 200 may also include a battery 220, for managing the power for the system. The computing device 200 may also include program instructions stored in the storage 230. The methods and/or processes of the present disclosure may be implemented as the program instructions. The computing device 200 may execute the operation system stored in the storage 230, for example, Windows Server, Mac OS X, Unix, Linux, FreeBSD, or the like. The computing device 200 also includes an I/O component 250, supporting input/output between the computing device and other components therein. The computing device 200 may also receive programming and data via network communications.

Merely for illustration, only one processor 210 is illustrated in the computing device 200. However, it should be noted that the computing device 200 in the present disclosure may also include multiple processors, thus operations and/or method steps that are performed by one processor as described in the present disclosure may also be jointly or separately performed by the multiple processors. For example, if in the present disclosure the processor of the computing device 200 executes both step A and step B, it should be understood that step A and step B may also be performed by two different processors jointly or separately in the computing device 200 (e.g., the first processor executes step A and the second processor executes step B, or the first and second processors jointly execute steps A and B).

Those skilled in the art will recognize that the present teachings are amenable to a variety of modifications and/or enhancements. For example, although the implementation of various components described herein may be embodied in a hardware device, it may also be implemented as a software only solution, for example, an installation on an existing server. In addition, the computing device 200 as disclosed herein may be implemented as a firmware, firmware/software combination, firmware/hardware combination, or a hardware/firmware/software combination.

Figure 3:
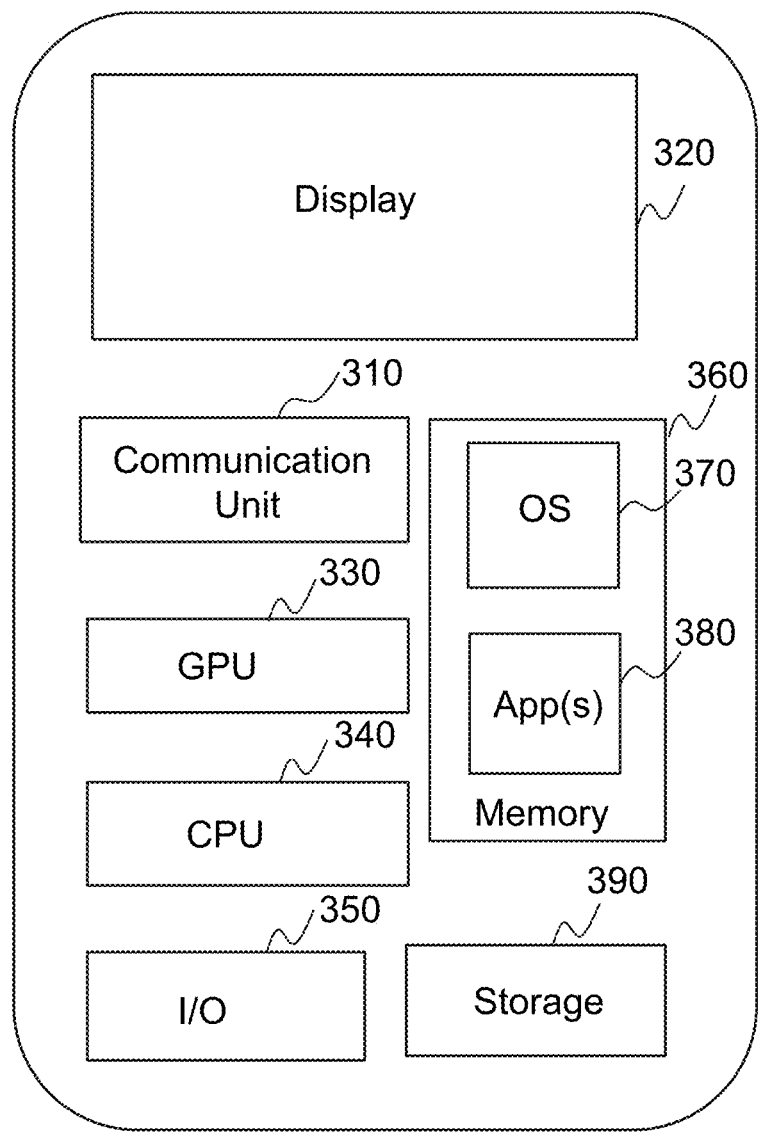
FIG. 3 is a schematic diagram illustrating exemplary hardware and/or software components of an exemplary mobile device according to some embodiments of the present disclosure.

FIG. 3 is a schematic diagram illustrating exemplary hardware and/or software components of an exemplary mobile device 300 on which the ANDROID terminal 120 or the application operator terminal 150 may be implemented according to some embodiments of the present disclosure. As illustrated in FIG. 3, the mobile device 300 may include a communication unit 310, a display 320, a graphic processing unit (GPU) 330, a central processing unit (CPU) 340, an I/O 350, a memory 360, and a storage 390. The CPU 340 may include interface circuits and processing circuits similar to the processor 220. In some embodiments, any other suitable component, including but not limited to a system bus or a controller (not shown), may also be included in the mobile device 300. In some embodiments, a mobile operating system 370 (e.g., iOS™, ANDROID™, Windows Phone™, etc.) and one or more applications 380 may be loaded into the memory 360 from the storage 390 in order to be executed by the CPU 340. The applications 380 may include a program designed to perform functions, tasks, or activities for users. User interactions with the information stream may be achieved via the I/O devices 350 and provided to the processing engine 112 and/or other components of the system 100 via the network 140.

In order to implement various modules, units and their functions described above, a computer hardware platform may be used as hardware platforms of one or more elements (e.g., a module of the sever 110 described in FIG. 2). Since these hardware elements, operating systems, and program languages are common, it may be assumed that persons skilled in the art may be familiar with these techniques and they may be able to provide information required in the route planning according to the techniques described in the present disclosure. A computer with user interface may be used as a personal computer (PC), or other types of workstations or terminal devices. After being properly programmed, a computer with user interface may be used as a server. It may be considered that those skilled in the art may also be familiar with such structures, programs, or general operations of this type of computer device. Thus, extra explanations are not described for the figures.

Figure 4:
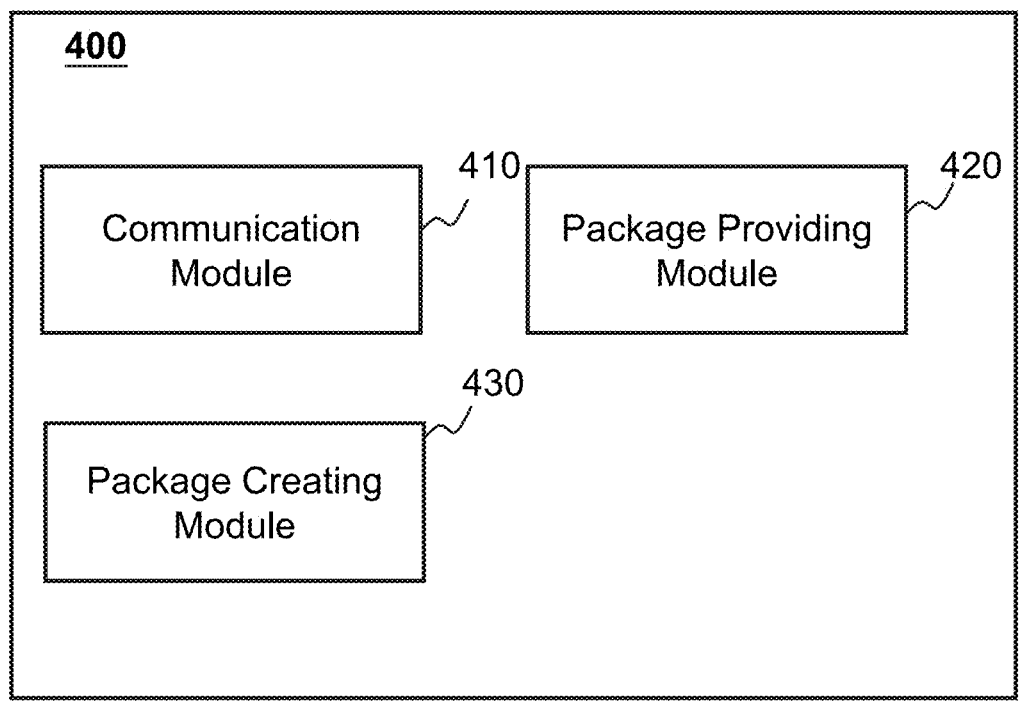
FIG. 4 is a block diagram illustrating an exemplary processing engine according to some embodiments of the present disclosure.

FIG. 4 is a block diagram illustrating an exemplary processing engine 112 according to some embodiments of the present disclosure. The processing engine 112 may include a communication module 410, a package providing module 420, and a package creating module 430. The modules may be hardware circuits of all or part of the processing engine 112. The modules may also be implemented as an application or set of instructions read and executed by the processing engine 112. Further, the modules may be any combination of the hardware circuits and the application/instructions. For example, the modules may be the part of the processing engine 112 when the processing engine 112 is executing the application/set of instructions. In some embodiments, there may be interconnections between these modules. For example, the package providing module 420 may receive information from the communication module 410.

The communication module 410 may be configured to obtain or transmit data before, during, or after updating an application. For example, the communication module 410 may transmit an update notice of the application to a mobile device via the network 120. As another example, the communication module 410 may receive a modification of the application or an uploading of a new version of the application, e.g., from a developer. In some embodiments, the communication module 410 may execute obtaining or transmitting data in connection with updating an application in a form of electronic currents or electrical signals. Merely by way of example, the communication module 410 may receive electrical signals encoding the modification of the application or the uploading of a new version of the application, and send electrical signals encoding the update notice of the application.

In some embodiments, the communication module 410 may receive a response from the mobile device to the update notice. In some embodiments, the response from the mobile device to the update notice may be preset by the mobile device or the application without the user's awareness. For example, the mobile device may allow the applications installed therein to update automatically without asking the user of the mobile device. As another example, the application may include a built-in attribute for self-updating if there is an update notice for the application. In some embodiments, the response from the mobile device to the update notice may include an entry (e.g., permission or denial) by the user. For example, at the time that the user first installs the application, the mobile device or the application may ask the user whether the user permit the application to self-update. As another example, the mobile device may display a notification to the user upon receiving the update notice, seeking the user's entry (e.g., permission or denial) regarding the update.

In some embodiments, the application may include a shell and a pre-update plugin. In certain embodiments, the shell may include a plugin engine. In some embodiments, the shell may be a part of the application which is not associated with the core-business of the application, and need not to be updated. In certain embodiments, the shell may include an empty shell with a plugin engine. For example, the plugin engine may include a Virtual ANDROID Package (VirtualAPK), a Dynamic Load APK, an ANDROID Dynamic Loader, an ANDROID-Plugin Manager, or the like, or any combination thereof. In some embodiments, the plugin engine VirtualAPK may be a plugin framework, and have no constraints on the pre-update plugin. In some embodiments, an original APK may be used as a plugin. The APK may be compiled via a plugin project, and loaded by a host application (including a host APK). The loaded APK may create a separate object in the host APK; and the plugin engine VirtualAPK may manage the plugins via the object and give new meanings to the plugins. In some embodiments, the pre-updated plugin may be a part of the application which is associated with the core-business, and need to be updated. For example, the core-business of the application may be implemented in the pre-updated plugin. In some embodiments, the pre-update plugin may include a plurality of pre-updated resources in the application. For example, the pre-updated plugin may comprise a user interface (UI) that includes one or more pictures, one or more icons, one or more tables, one or more words, or the like, or any combination thereof.

The package providing module 420 may be configured to provide a resource installation package to the mobile device. In some embodiments, the package providing module 420 may provide the resource installation package to the mobile device upon the response from the mobile device to the update notice. In some embodiments, the package providing module may provide the resource installation package to the mobile device without the response. In certain embodiments, the resource installation package may be configured to direct the application to use the plugin engine in the shell to utilize the components of the resource installation package to update the pre-update plugin. In some embodiments, the resource installation package may be configured to direct the application to update the pre-update plugin without attaining approval from an application store platform.

In some embodiments, the resource installation package may be different from a host installation package of an ANDROID system. The host installation package of an ANDROID system may refer to a program file installed in a mobile device. In some embodiments, the resource installation package may include at least one UI resource that is to be updated but not installed. In some embodiments, the resource installation package may include a plurality of instructions to direct the application to update the pre-update plugin. The resource installation package may include at least one component (e.g., at least one update resource) that has been newly uploaded by the developer. The at least one newly uploaded component may be different from one or more pre-update resources in the pre-update plugin of the application. In some embodiments, the resource installation package may direct the application to use the at least one newly uploaded component in the resource installation package to update the corresponding at least one pre-update resource in the pre-update plugin, and use the plugin engine in the shell to update the pre-update plugin. For example, the resource installation package may direct the application to replace the at least one pre-update resource with at least one corresponding update resource having a same resource type and a same resource number, producing a replaced plugin. The resource installation package may direct the plugin engine VirtualAPK to load the replaced plugin.

The package creating module 430 may be configured to create and/or process the resource installation package. In some embodiments, the package creating module 430 may create the resource installation package. In some embodiments, the package creating module 430 may modify the package ID of one or more resources in the resource installation package. For example, when invoking resources installation packages, the package IDs of the resource installation package and a host installation package must be different; if the package ID of an resource in the host installation package is 7f, the package creating module 430 may modify the package ID of the corresponding resource in the resource installation package to a value of non 7f, in order to avoid the package ID of the resource in the resource installation package being the same as the package ID of the corresponding resource in the host installation package.

The communication module 410, the package providing module 420, and the package creating module 430 in the processing engine 112 may be connected to or communicated with each other via a wired connection or a wireless connection. The wired connection may include a metal cable, an optical cable, a hybrid cable, or the like, or any combination thereof. The wireless connection may include a Local Area Network (LAN), a Wide Area Network (WAN), a Bluetooth, a ZigBee, a Near Field Communication (NFC), or the like, or any combination thereof. Two or more of the modules may be combined as a single module, and any one of the modules may be divided into two or more units. For example, the package providing module 420 may be integrated into the package creating module 430 as a single module which may both create and process the resource installation package. As another example, the processing engine 112 may include a storage module (not shown in FIG. 4) which may be configured to store the data temporarily or permanently. As still another example, the communication module 410 may be divided into two units of an obtaining unit and a sending unit to implement the functions of the communication module 410, respectively.

Figure 5:
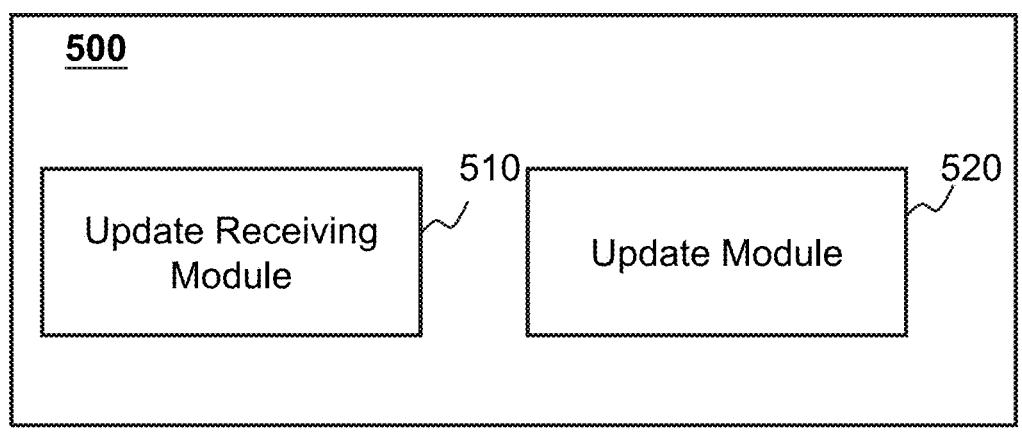
FIG. 5 is a block diagram illustrating some components of an exemplary application according to some embodiments of the present disclosure.

FIG. 5 is a block diagram illustrating some components of an exemplary application according to some embodiments of the present disclosure. In some embodiments, the application 500 may include an update receiving module 510 and an update module 520. The modules may be hardware circuits of all or part of the application 500. The modules may also be implemented as an application or a set of instructions read and executed by the application 500, and/or directed by the resource installation package. Further, the modules may be any combination of the hardware circuits and the application/instructions. For example, the modules may be a part of the application 500 when the application 500 is executing the application/set of instructions. In some embodiments, there may be interconnections between these modules. For example, the update receiving module 510 may send an update resource to the update module 520.

In some embodiments, the update receiving module 510 may be configured to receive components (e.g., update resources) in the resource installation package; the update module 520 may be configured to update the application. For example, the update module 520 may be configured to use the plugin engine in the shell to utilize components of the resource installation package to update the pre-update plugin. As another example, the update module 520 may replace one or more of the pre-update resources with one or more corresponding update resources. In some embodiments, the update module 520 may obtain a pre-update resource bundle; identify a corresponding update resource bundle in the resource installation package; modify the bundle ID of the update resource bundle to be the same as the bundle ID of the pre-update resource bundle, and then integrate the update resource bundle with the modified bundle ID into the application.

The update receiving module 510 and the update module 520 in the application 500 may be connected to or communicated with each other via a wired connection or a wireless connection. The wired connection may include a metal cable, an optical cable, a hybrid cable, or the like, or any combination thereof. The wireless connection may include a Local Area Network (LAN), a Wide Area Network (WAN), a Bluetooth, a ZigBee, a Near Field Communication (NFC), or the like, or any combination thereof. Two or more of the modules may be combined as a single module, and any one of the modules may be divided into two or more units. For example, the application 500 may include a storage module (not shown in FIG. 5) which may be configured to store the data temporarily or permanently. As another example, the update module 520 may be divided into two or more units to implement the functions of the update module 520, respectively.

Figure 6:
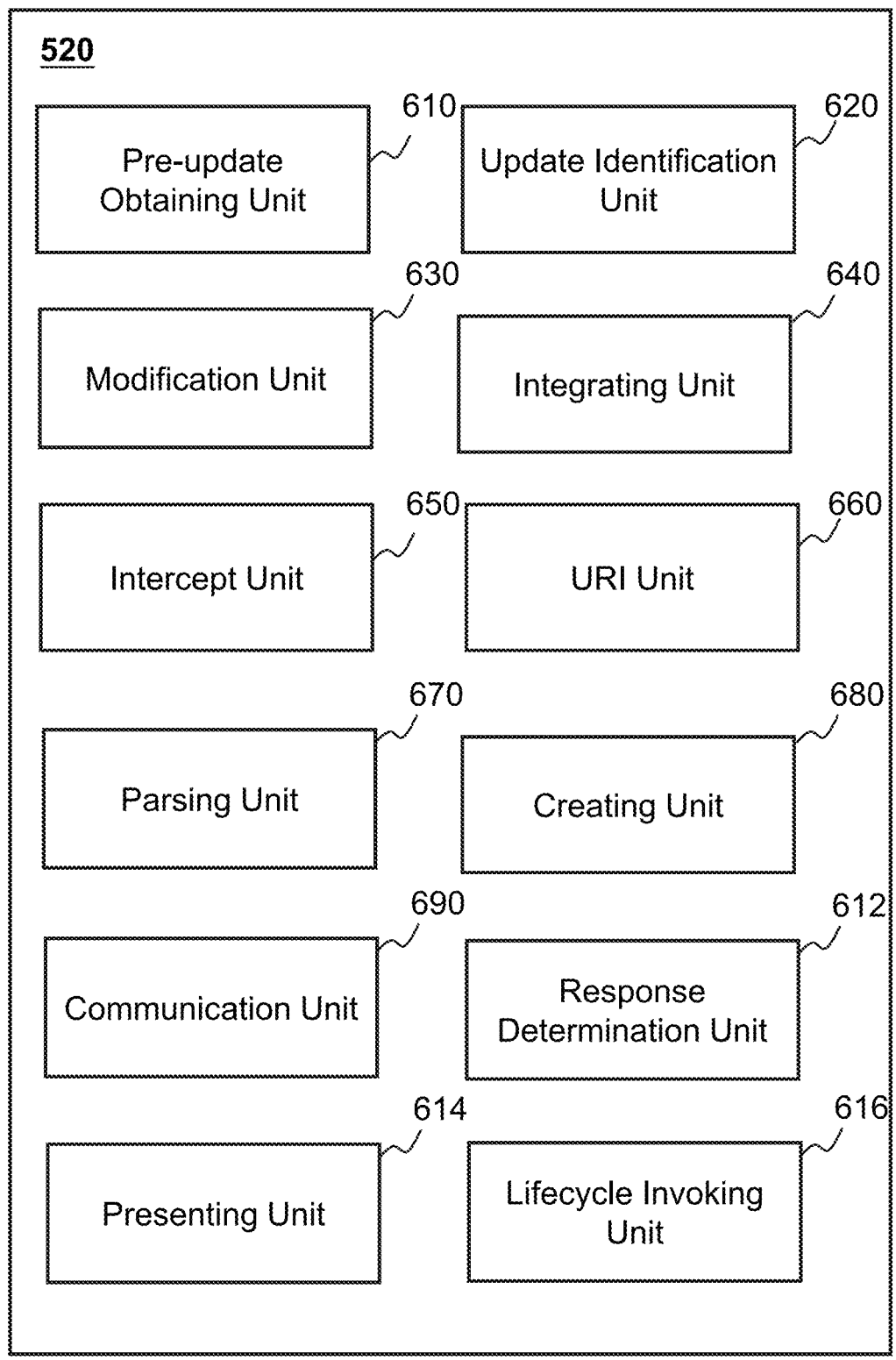
FIG. 6 is a block diagram illustrating an exemplary update module according to some embodiments of the present disclosure.

FIG. 6 is a block diagram illustrating an exemplary update module 520 according to some embodiments of the present disclosure. The update module 520 may include a pre-update obtaining unit 610, an update identification unit 620, a modification unit 630, an integrating unit 640, an intercept unit 650, a URI unit 660, a parsing unit 670, a creating unit 680, a communication unit 690, a response determination unit 612, a presenting unit 614, and a lifecycle invoking unit 616. Each, part, of all of the units may be hardware circuits of all or part of the update module 520. Each, part, of all of the units may also be implemented as an application or a set of instructions read and executed by the update module 520, and/or directed by the resource installation package. Further, the units may be any combination of the hardware circuits and the application/instructions. For example, the units may be a part of the update module 520 when the update module 520 is executing the application/set of instructions. In some embodiments, there may be interconnections between these modules. For example, the communication unit 690 may receive information from the creating unit 680, and send information to the presenting unit 614.

The pre-update obtaining unit 610 may be configured to obtain a pre-update resource bundle in a pre-update plugin. In some embodiments, the pre-update resource bundle may include a bundle ID, a resource type, a resource number, or the like, or any combination thereof. In some embodiments, the pre-update obtaining unit 610 obtains the pre-update resource bundle in the pre-update plugin according to an execution instruction (e.g., requesting an ID of the pre-update resource bundle).

The update identification unit 620 may be configured to identify a corresponding update resource bundle in the resource installation package. The update resource bundle may include a same resource type and a same resource number as the pre-update resource bundle. In some embodiments, the update identification unit 620 may search whether there is an update resource bundle who has a same resource type and a same resource number as the pre-update resource bundle in the resource installation package.

The modification unit 630 may be configured to modify the bundle ID of the update resource bundle to be the same as the bundle ID of the pre-update resource bundle.

The integrating unit 640 may be configured to integrate the update resource bundle with the modified bundle ID into the application. For example, the integrating unit 640 may invoke the update resource bundle whose bundle ID is modified to be the same as the bundle ID of the pre-update resource bundle.

The intercept unit 650 may be configured to intercept activating the pre-update plugin via the plugin engine. In some embodiments, the pre-update plugin may be activated by the plugin engine in the application to display a content associated with the pre-update plugin on the UI of a mobile device. When the processing engine 112 provides a resource installation package to the mobile device, the application may use the plugin engine to intercept activating the pre-update plugin in order to stop displaying the content associated with the pre-update plugin.

The URI unit 660 may be configured to direct a uniform resource identifier (URI) of the pre-update plugin to a URI of a proxy plugin, and/or store the URI of the pre-update plugin in the URI of the proxy plugin. In some embodiments, each plugin of the application may include a URI. In certain embodiments, the URI may refer to a string of characters used to identify a resource in each plugin.

The parsing unit 670 may be configured to parse the URI of the pre-update plugin in the proxy plugin. In some embodiments, the application may break down the string of the URI of the pre-update plugin to obtain function information of the pre-update plugin.

The creating unit 680 may be configured to create an updated plugin based on the parsed URI. In some embodiments, the creating unit 680 may be configured to further create a proxy plugin. In some embodiments, the proxy plugin may refer to an intermediary or substituting unit that stores URI of the pre-update plugin during updating the pre-update plugin. The URI of the proxy plugin may be associated with the URI of the pre-update plugin. In some embodiments, the proxy plugin may refer to a communication device that receive and/or send information (e.g., an external request, the response to the external request) during the updating of the pre-update plugin.

The communication unit 690 may be configured to receive an external request from a user, transmit the external request to the updated plugin via the proxy plugin, and/or transmit the response to the proxy plugin via the update plugin. In some embodiments, the external request may include an instruction from the user to open the application, an instruction from the user to open a function in the application, an instruction from the user to request for a service in the application, or the like, or any combination thereof.

The response determination unit 612 may be configured to determine a response to the external request. In some embodiments, the response to the external request may include opening the application, opening a function in the application, providing a service in the application, or the like, or any combination thereof.

The presenting unit 614 may be configured to present the response to the external request. In some embodiments, the presenting unit 614 may display the content associated with the updated plugin based on the received response from the proxy plugin.

The lifecycle invoking unit 616 may be configured to invoke a lifecycle of the updated plugin in a user interface thread. In some embodiments, the lifecycle invoking unit 616 may manage the lifecycle of the updated plugin.

The pre-update obtaining unit 610, the update identification unit 620, the modification unit 630, the integrating unit 640, the intercept unit 650, the URI unit 660, the parsing unit 670, the creating unit 680, the communication unit 690, the response determination unit 612, the presenting unit 614, and the lifecycle invoking unit 616 may be connected to or communicated with each other via a wired connection or a wireless connection. The wired connection may include a metal cable, an optical cable, a hybrid cable, or the like, or any combination thereof. The wireless connection may include a Local Area Network (LAN), a Wide Area Network (WAN), a Bluetooth, a ZigBee, a Near Field Communication (NFC), or the like, or any combination thereof. Two or more of the modules may be combined as a single module, and any one of the modules may be divided into two or more units. For example, the update identification unit 620 may be integrated into the modification unit 630 as a single unit which may both identify and modify the pre-update resource bundle. As another example, the update module 520 may include a storage unit (not shown in FIG. 6) which may be configured to store the data temporarily or permanently. As still another example, the communication unit 690 may be divided into two sub-units of an obtaining sub-unit and a sending sub-unit to implement the functions of the communication unit 614, respectively.

FIG. 7 is a flowchart illustrating an exemplary process 700 for updating and loading an application installed in a mobile device according to some embodiments of the present disclosure. In some embodiments, one or more steps in the process 700 may be executed by the system 100 as illustrated in FIG. 1. For example, one or more steps in the process 700 may be implemented as a set of instructions (e.g., an application program) stored in the storage (e.g., the storage 130, the storage 390, etc.), and invoked and/or executed by the server 110 (e.g., the processing engine 112, the processor 210 of the processing engine 112). The operations of the illustrated process 700 presented below are intended to be illustrative. In some embodiments, the process 700 may be accomplished with one or more additional operations not described, and/or without one or more of the operations discussed. Additionally, the order in which the operations of the process 700 as illustrated in FIG. 7 and described below is not intended to be limiting.

In 710, the processing engine 112 (e.g., the processor 210, the communication module 410) may transmit an update notice of the application to a mobile device. In some embodiments, the application includes a shell and a pre-update plugin, and the shell includes a plugin engine.

In some embodiments, after the processing engine 112 receives a modification of the application or an uploading of a new version of the application, the processing engine 112 may transmit the update notice to the mobile device. In some embodiments, the modification of the application or the uploading of a new version of the application is from a developer of the application. The processing engine 112 may or may not be associated with the developer. In some embodiments, the mobile device receives the update notice and informs a user of the mobile device about the update notice. In some embodiments, the mobile device receives the update notice but does not inform the user, proceeding with the update automatically (e.g., with prior approval from the user when the application was installed).

In some embodiments, the shell may be a part of the application that is not associated with the core-business of the application, and need not to be updated. The shell may include an empty shell with a plugin engine. For example, the plugin engine may include a Virtual ANDROID Package (VirtualAPK), a Dynamic Load APK, an ANDROID Dynamic Loader, an ANDROID-Plugin Manager, or the like, or any combination thereof. In some embodiments, the plugin engine VirtualAPK may be a plugin framework, and have no constraints on the pre-update plugin. In some embodiments, an original APK may be used as a plugin. The APK may be compiled via a plugin project, and loaded by a host application (including a host APK). The loaded APK may create a separate object in the host APK; and the plugin engine VirtualAPK may manage the plugins via the object.

In some embodiments, the pre-updated plugin may be a part of the application which is associated with the core-business, and need to be updated. For example, the core-business of the application may be implemented in the pre-updated plugin. In some embodiments, the pre-update plugin may include a plurality of pre-updated resources in the application. For example, the pre-updated plugin may comprise a user interface (UI) that includes one or more pictures, one or more icons, one or more words, or the like, or any combination thereof.

In 720, the processing engine 112 (e.g., the processor 220, the package providing module 420) may provide a resource installation package to the mobile device upon a response from the mobile device to the update notice. The resource installation package may be configured to direct the application to use the plugin engine in the shell to utilize the components of the resource installation package to update the pre-update plugin. In some embodiments, since the application update is based on communication between the mobile device and the processing engine 112, the application store platform is bypassed. In certain embodiments, the resource installation package may be configured to direct the application to update the pre-update plugin without attaining approval from the application store platform.

In some embodiments, the response from the mobile device to the update notice may be preset by the mobile device or the application without the user's instant awareness. For example, the mobile device may allow the applications installed therein to update automatically without asking the user of the mobile device for approval or permission (e.g., instant approval or permission, or any prior approval or permission). As another example, the application may include a built-in attribute for self-updating if there is an update of the application. In some embodiments, the response from the mobile device to the update notice may include a permission (e.g., instant or prior) by the user. For example, at the time that the user first installs the application, the mobile device or the application may ask the user whether the user permits the application to self-update. As another example, when there is a resource installation package, the mobile device or the application may present a dialog on the user interface to ask the user whether to update the application or not. The user may agree to update via the mobile device as the response to the update notice.

In some embodiments, the resource installation package may be different from a host installation package of an ANDROID system. The host installation package of an ANDROID system may refer to a program file installed in a mobile device. The resource installation package may include at least one UI resource that is to be updated but not installed. In some embodiments, the resource installation package may direct the application to add a download module in the host installation package. The download module may be configured to download and/or manage the resource installation package.

In some embodiments, the resource installation package may include a plurality of instructions to direct the application to update the pre-update plugin. In certain embodiments, the resource installation package may include at least one component (e.g., at least one update resource) that has been newly uploaded by the developer. The at least one newly uploaded component may be different from one or more pre-update resources in the pre-update plugin of the application. In some embodiments, the resource installation package may direct the application to use the at least one newly uploaded component in the resource installation package to update the corresponding at least one pre-update resource in the pre-update plugin, and use the plugin engine in the shell to update the pre-update plugin. For example, the resource installation package may direct the application to replace the at least one pre-update resource with a corresponding update resource having a same resource type and a same resource number. The resource installation package may direct the plugin engine VirtualAPK to load the replaced plugin. For some embodiments, detailed description of using the plugin engine to update the pre-update plugin may be found in connection with FIG. 8 in the present disclosure.

In some embodiments, the developer does not upload the resource installation package onto an application store platform. The resource installation package may implement the process of updating the application without attaining approval from the application store platform. In some embodiments, the processing engine 112 (e.g., the processor 220, the package creating module 430) may create the resource installation package after the developer uploads the resource installation package to the server 110. For example, a picture A in the resource installation package (e.g., a demo1.apk) and a picture B in the host installation package (e.g., a demo2.apk) may include a same package ID (e.g., a default value of 7f). The processing engine 112 may first modify the package ID of the picture A in the resource installation package to a non 7f value (e.g., 6c) to avoid the same package ID of the picture B in the host installation package. The resource type and the resource number of the update resource bundle in the resource installation package and the pre-update resource bundle in the host installation package may be the same, so that the update resource bundle may accurately be mapped with the pre-update resource bundle. For example, the bundle ID of an update resource bundle is 0x7f0202ed, in which 7f is the package ID of the update resource bundle. The processing engine 112 (e.g., the processor 220, the package creating module 430) may modify the bundle ID as 0x6c0202ed, in which the package ID 6*c* replaces original 7f. In some embodiments, after the processing engine 112 creating the resource installation package, the mobile device may automatically download the resource installation package from processing engine 112 to update the application.

It should be noted that the above description is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure. For example, one or more other optional steps (e.g., a storing step, a preprocessing step) may be added elsewhere in the exemplary process 700. As another example, all the steps in the exemplary process 700 may be implemented in a computer-readable medium including a set of instructions. The instructions may be transmitted in a form of electronic current or electrical signals.

Figure 8:
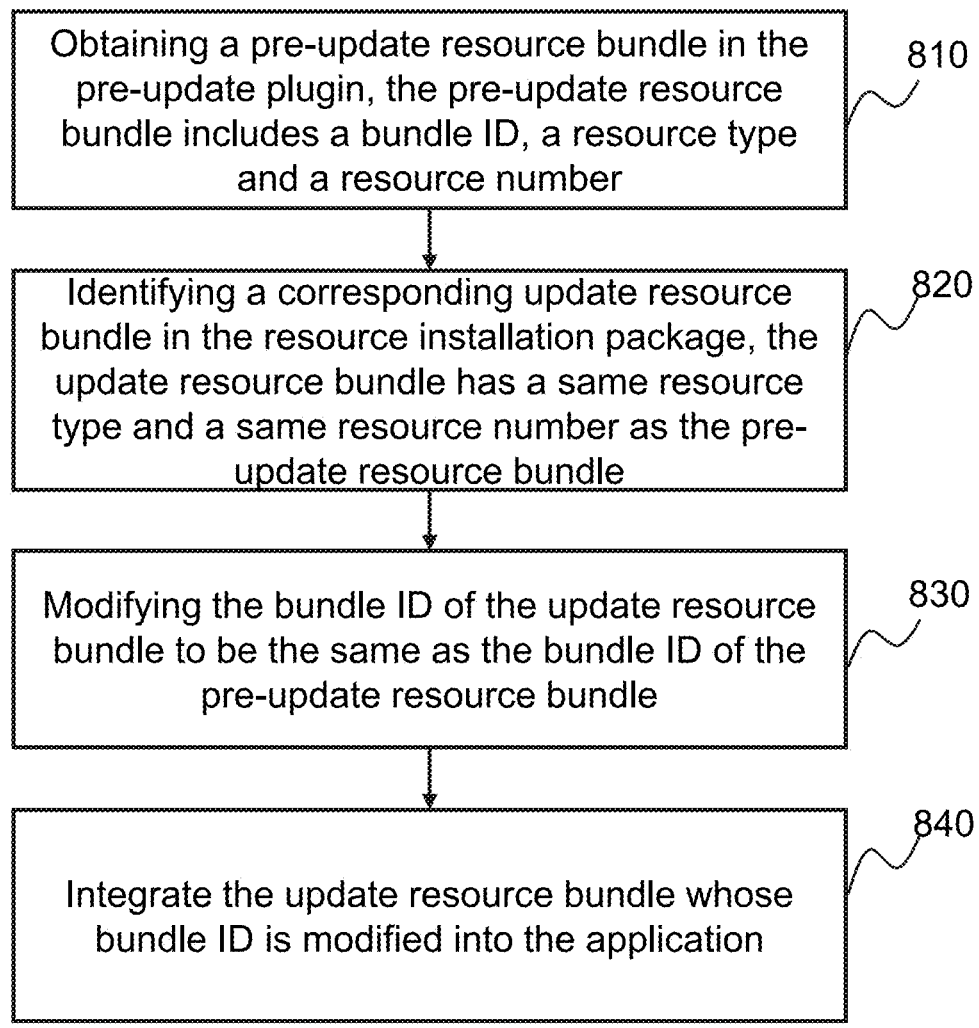
FIG. 8 is a flowchart illustrating an exemplary process for using a plugin engine in a shell to update a pre-update plugin according to some embodiments of the present disclosure.

FIG. 8 is a flowchart illustrating an exemplary process 800 for using a plugin engine in a shell to update a pre-update plugin according to some embodiments of the present disclosure. In some embodiments, one or more steps in the process 800 may be executed by the application which is directed by the resource installation package. For example, one or more steps in the process 800 may be implemented as a set of instructions stored in the resource installation package, and invoked and/or executed by the application. The operations of the illustrated process 800 presented below are intended to be illustrative. In some embodiments, the process 800 may be accomplished with one or more additional operations not described, and/or without one or more of the operations discussed. Additionally, the order in which the operations of the process 800 as illustrated in FIG. 8 and described below is not intended to be limiting.

In 810, the resource installation package may direct the application (e.g., the update module 520, the pre-update obtaining unit 610) to obtain a pre-update resource bundle in the pre-update plugin. In some embodiments, the pre-update resource bundle may include a bundle ID, a resource type, a resource number, or the like, or any combination thereof.

In some embodiments, the pre-update obtaining unit 610 may obtain the pre-update resource bundle in the pre-update plugin according to an execution instruction. For example, the pre-update plugin may include a plurality of pre-update resource bundles. When a user of the application uses a pre-update resource bundle, the application may generate an execution instruction to request an ID of the pre-update resource bundle. The pre-update obtaining unit 610 may obtain the pre-update resource bundle in the pre-update plugin according to the requested ID of the pre-update resource bundle.

In some embodiments, the host installation package may allocate a bundle ID for every UI resource. For example, the bundle ID of a picture A may be0x7f0202ed, wherein the 0x denotes a hexadecimal, 7f denotes the installation package ID (the default installation package IDs of all the applications may be7f), 02 denotes a resource type (e.g., a picture, a color, an animation, or a video, etc., each type may have a different value), and 02*ed* denotes a resource number which may be allocated in an increasing order by a compiling system when building the host installation package.

In 820, the resource installation package may direct the application (e.g., the update module 520, the update identification unit 620) to identify a corresponding update resource bundle in the resource installation package. The update resource bundle has a same resource type and a same resource number as the pre-update resource bundle.

In some embodiments, the update identification unit 620 may search whether there is an update resource bundle that has a same resource type and a same resource number as the pre-update resource bundle in the resource installation package.

In 830, the resource installation package may direct the application (e.g., the update module 520, the modification unit 630) to modify the bundle ID of the update resource bundle to be the same as the bundle ID of the pre-update resource bundle.

In 840, the resource installation package may direct the application (e.g., the update module 520, the integrating unit 640) to integrate the update resource bundle with the modified bundle ID into the application. For example, the integrating unit 640 may invoke the update resource bundle whose bundle ID is modified to be the same as the bundle ID of the pre-update resource bundle in the resource installation package.

It should be noted that the above description is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure. For example, one or more other optional steps (e.g., a storing step, a preprocessing step) may be added elsewhere in the exemplary process 800. As another example, all the steps in the exemplary process 800 may be implemented in a computer-readable medium including a set of instructions. The instructions may be transmitted in a form of electronic current or electrical signals.

Figure 9:
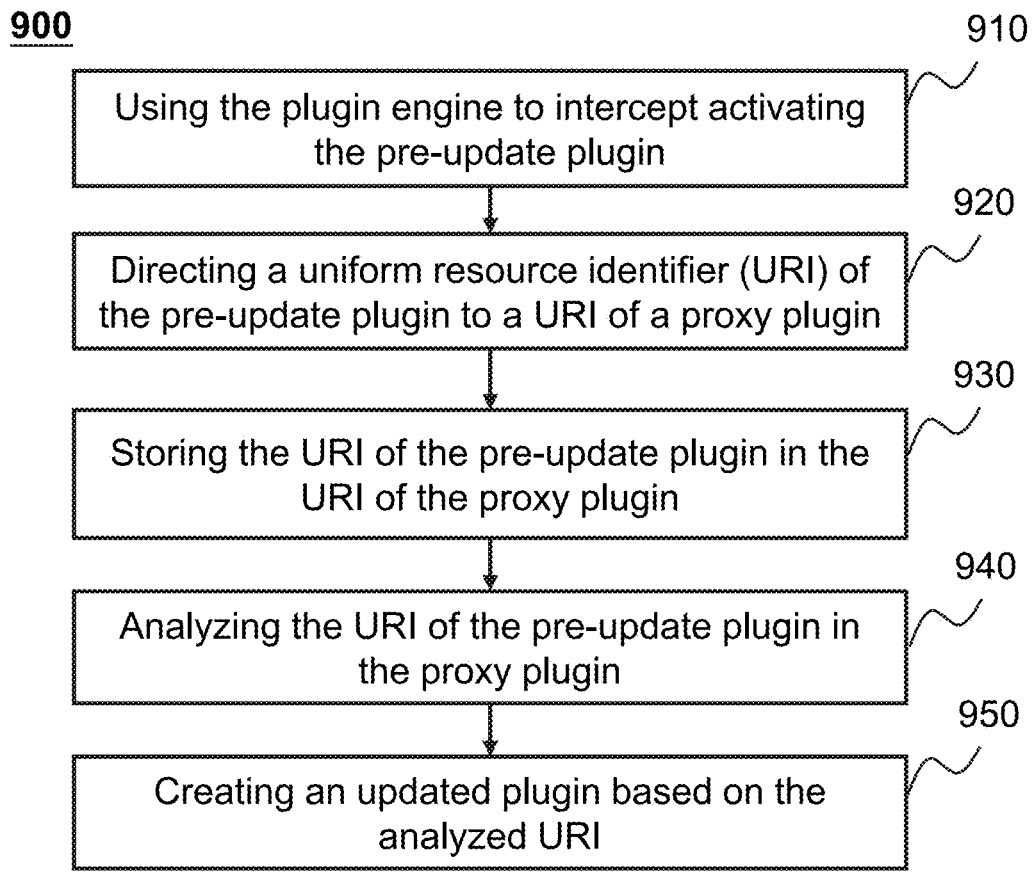
FIG. 9 is a flowchart illustrating an exemplary process for using a plugin engine in a shell to update a pre-update plugin according to some embodiments of the present disclosure.

FIG. 9 is a flowchart illustrating an exemplary process 900 for using the plugin engine in the shell to update the pre-update plugin according to some embodiments of the present disclosure. In some embodiments, one or more steps in the process 900 may be executed by the application which is directed by the resource installation package. For example, one or more steps in the process 900 may be implemented as a set of instructions stored in the resource installation package, and invoked and/or executed by the application. The operations of the illustrated process 900 presented below are intended to be illustrative. In some embodiments, the process 900 may be accomplished with one or more additional operations not described, and/or without one or more of the operations discussed. Additionally, the order in which the operations of the process 900 as illustrated in FIG. 9 and described below is not intended to be limiting.

In 910, the resource installation package may direct the application (e.g., the update module 520, the intercept unit 650) to use the plugin engine to intercept activating the pre-update plugin. In some embodiments, the pre-update plugin may be activated by the plugin engine in the application to display a content associated with the pre-update plugin on the UI of a mobile device. When the processing engine 112 provides a resource installation package to the mobile device, the application may use the plugin engine to intercept activating the pre-update plugin in order to stop displaying the content associated with the pre-update plugin. For example, the pre-update plugin is associated with a title table displayed on the UI, and its content may be "Welcome to XXX". When a festival (e.g., Christmas, New Year, etc.) is coming, the developer may want to change the content of the title table, and direct the application to use the plugin engine to intercept activating pre-update plugin (e.g., stop displaying "Welcome to XXX"), so that an update can be implemented. As another example, during the New Year, the developer wants to change three ordinary buttons on the UI of the application into three buttons with three words of "Happy New Year". The developer may build a resource APK of the three buttons with the words "Happy New Year", and deploy the resource APK to the server, then the resource APK may be downloaded to the terminal device. When the users open the application, the resource APK may direct the application to use the plugin engine to intercept activating the pre-update plugin (e.g., displaying the three ordinary buttons), so that the three buttons with the words of "Happy New Year" may be displayed on the UI of the application.

In 920, the resource installation package may direct the application (e.g., the update module 520, the URI unit 660) to direct a uniform resource identifier (URI) of the pre-update plugin to a URI of a proxy plugin. In some embodiments, each plugin of the application may include a URI. The URI may refer to a string of characters used to identify a resource in each plugin. In some embodiments, the URI may include a scheme, an authority part, a path, an optional query, an optional fragment, or the like, or any combination thereof. For example, the URI of the pre-update plugin may be a string of "file://username:password@example.com:123/path/data?key=value&key2=val ue2 #fragid1".

In some embodiments, the application may create a proxy plugin, and direct the URI of the pre-update plugin to the proxy plugin. In some embodiments, the proxy plugin may refer to an intermediary or substituting unit that stores URI of the pre-update plugin during the updating of the pre-update plugin. For example, the application may not invoke the updated plugin directly. The application may direct the URI of the pre-update plugin to the proxy plugin. The URI of the proxy plugin may be associated with the URI of the pre-update plugin. In some embodiments, the proxy plugin may refer to a communication device that receive and/or send information (e.g., an external request, the response to the external request) during the updating of the pre-update plugin.

In 930, the resource installation package may direct the application (e.g., the update module 520, the URI unit 660) to store the URI of the pre-update plugin in the URI of the proxy plugin.

In 940, the resource installation package may direct the application (e.g., the update module 520, the parsing unit 670) to parse the URI of the pre-update plugin in the proxy plugin. In some embodiments, the application may break down the string of the URI of the pre-update plugin to obtain function information of the pre-update plugin.

In 950, the resource installation package may direct the application (e.g., the update module 520, the creating unit 680) to create an updated plugin based on the parsed URI. In some embodiments, the resource installation package may direct the application (e.g., the update module 520, the lifecycle invoking unit 616) to invoke a lifecycle of the updated plugin in a user interface threshold to manage the lifecycle of the updated plugin. The lifecycle may include onCreate, onStartCommand, ONPauseCommand, onDestroyCommand, or the like, or any combination thereof.

It should be noted that the above description is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure. For example, one or more other optional steps (e.g., a storing step, a preprocessing step) may be added elsewhere in the exemplary process 900. As another example, all the steps in the exemplary process 900 may be implemented in a computer-readable medium including a set of instructions. The instructions may be transmitted in a form of electronic current or electrical signals.

Figure 10:
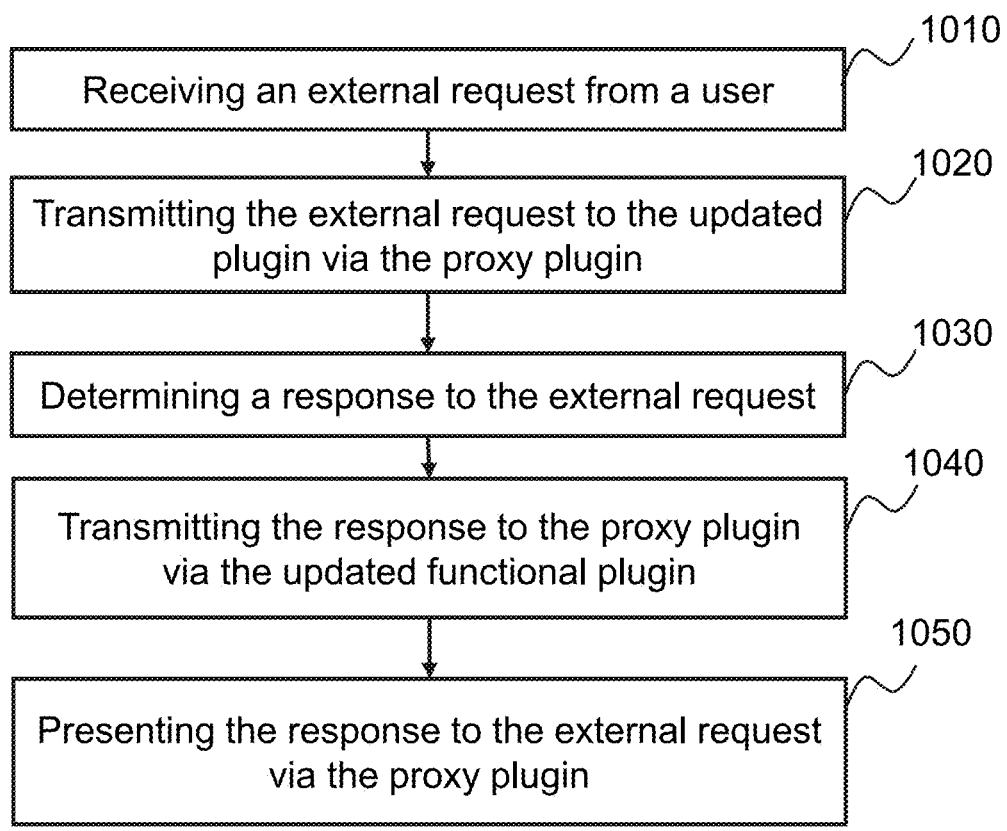
FIG. 10 is a flowchart illustrating an exemplary process for presenting a response to an external request according to some embodiments of the present disclosure.

FIG. 10 is a flowchart illustrating an exemplary process 1000 for presenting a response to an external request according to some embodiments of the present disclosure. In some embodiments, one or more steps in the process 1000 may be executed by the application which is directed by the resource installation package. For example, one or more steps in the process 1000 may be implemented as a set of instructions stored in the resource installation package, and invoked and/or executed by the application. The operations of the illustrated process 1000 presented below are intended to be illustrative. In some embodiments, the process 1000 may be accomplished with one or more additional operations not described, and/or without one or more of the operations discussed. Additionally, the order in which the operations of the process 1000 as illustrated in FIG. 10 and described below is not intended to be limiting.

In 1010, the application (e.g., the update module 520, the communication unit 690) may receive an external request from a user. In some embodiments, the external request may include an instruction from the user to open the application, an instruction from the user to open a function in the application, an instruction from the user to request for a service in the application, or the like, or any combination thereof.

In 1020, the resource installation package may direct the application (e.g., the update module 520, the communication unit 690) to transmit the external request to the updated plugin via the proxy plugin. In 1030, the resource installation package may direct the application (e.g., the update module 520, the response determination unit 612) to determine a response to the external request. In some embodiments, the response to the external request may include opening the application, opening a function in the application, providing a service in the application, or the like, or any combination thereof. For example, the user sends an external request for opening a taxi service in a car hailing application, the car hailing application may send the external request to an updated plugin via a proxy plugin. The car hailing application may invoke a new UI of the taxi service in the updated plugin in response to the external request.

In 1040, the resource installation package may direct the application (e.g., the update module 520, the communication unit 690) to transmit the response to the proxy plugin via the updated plugin. In 1050, the resource installation package may direct the application (e.g., the update module 520, the presenting unit 614) to present the response to the external request via the proxy plugin. For example, the application may display the new UI of the taxi service in the updated plugin in response to the external request.

In some embodiments, the pre-update plugin may include a plurality of components. For example, the pre-update plugin may include an Activity component, a Service component, a Broadcast Receiver component, a Content Provider component, or the like, or any combination thereof. The Activity component may refer to an interactive window between the application and the user. The Service component may refer to a program without an UI. The Broadcast Receiver component may be configured to receiver an external event and make a response to the external event. The Content Provider component may be configured to provide a designated dataset to other applications. For example, the Content Provider component may store and retrieve data, and share data between applications. Merely by way of example, the Content Provider component and the Service component may be described for illustrating a process for updating the pre-update plugin.

In some embodiments, each Content Provider component may include at least one dataset. Each dataset may include a URI. For example, if a Content Provider component includes only one dataset, the Content Provider component may include only one URI. As another example, if the Content Provider component includes a plurality of datasets, the Content Provider component may include a plurality corresponding URIs, each URI may correspond to a dataset. The Content Provider may be stored in an android provider package of the pre-update plugin. When updating the pre-update plugin, the resource installation package may direct the application to use the plugin engine to intercept activating the Content Provider component. In some embodiments, the application may direct the original URI of the Content Provider component in the pre-update plugin to a URI of a proxy Content Provider component, and store the original URI in the URI of the proxy Content Provider component. In some embodiments, the application may parse the original URI of Content Provider component stored in the proxy Content Provider component, and create an updated Content Provider component. In some embodiments, the application may invoke a lifecycle of the updated Content Provider component. In some embodiments, when the application receives an external request, the application may transmit the external request to the updated Content Provider component via the proxy Content Provider component. The updated Content Provider component may respond to the external request, and the proxy Content Provider component may present the response to the user. The approach that adopts the proxy idea into the Service component may not only accurately stimulate the start status of the Service component, but also accurately stimulate the bind status of the Service component, which makes it indistinguishable as to whether the Service component is in the plugin or is actually registered in the system. In some embodiments, the Service component is a solution that helps to allow programs to run in the background in the ANDROID system. In some embodiments, the Service component is suitable for those long-term missions without interaction with users.

In some embodiments, the Service component may be configured to run solutions in the background of the application, which is not interactive with the user. For example, the Service component may be used in a multimedia player. The user starts the Activity component of the multimedia player, and the multimedia may play in the background via the Service component. The Service component may implement receiving an intent parameter. When updating the pre-update plugin, the resource installation package may direct the application to hook AMS, and use the plugin engine to intercept certain processes the Service component. For example, the application may intercept Service component-related processes such as: startService, stopService, bindService, unbindService, etc. The application may then pack the original intent, direct the original intent of the Service component to a proxy Service component, and store the original intent in the proxy Service component. In some embodiments, the application may then parse the original intent in the proxy Service component, and create a Service object. In some embodiments, the application may invoke a lifecycle of the Service object. For example, the application may invoke onCreate Command, onStart Command, onStop Command, or the like, or any combination thereof. As another example, the application may implement a certain logic in the onCreate Command, onStart Command, onStop Command, or the like, or any combination thereof. In some embodiments, if the Service component runs remotely, the corresponding proxy Service component may run remotely, too. When the Activity component tries to bind the Service component, a Runtime Service may manage a binder of the Service component, and send the binder to the Activity component. Accordingly, the Service component may be bound. The Runtime Service may refer to a business component, which is configured to manage data during runtime, and provide an application programming interface for operating a procedure.

It should be noted that the above description is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure. For example, one or more other optional steps (e.g., a storing step, a preprocessing step) may be added elsewhere in the exemplary process 1000. As another example, all the steps in the exemplary process 1000 may be implemented in a computer-readable medium including a set of instructions. The instructions may be transmitted in a form of electronic current or electrical signals.

Having thus described the basic concepts, it may be rather apparent to those skilled in the art after reading this detailed disclosure that the foregoing detailed disclosure is intended to be presented by way of example only and is not limiting. Various alterations, improvements, and modifications may occur and are intended to those skilled in the art, though not expressly stated herein. These alterations, improvements, and modifications are intended to be suggested by this disclosure, and are within the spirit and scope of the exemplary embodiments of this disclosure.

Moreover, certain terminology has been used to describe embodiments of the present disclosure. For example, the terms "one embodiment," "an embodiment," and/or "some embodiments" mean that a particular feature, structure or characteristic described in connection with the embodiment is included in at least one embodiment of the present disclosure. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments of the present disclosure.

Further, it will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, micro-code, etc.) or combining software and hardware implementation that may all generally be referred to herein as a "unit," "module," or "system." Furthermore, aspects of the present disclosure may take the form of a computer program product embodied in one or more computer readable media having computer readable program code embodied thereon.

A computer readable signal medium may include a propagated data signal with computer readable program code embodied therein, for example, in baseband or as part of a carrier wave. Such a propagated signal may take any of a variety of forms, including electro-magnetic, optical, or the like, or any suitable combination thereof. A computer readable signal medium may be any computer readable medium that is not a computer readable storage medium and that may communicate, propagate, or transport a program for use by or in connection with an instruction execution system, apparatus, or device. Program code embodied on a computer readable signal medium may be transmitted using any appropriate medium, including wireless, wireline, optical fiber cable, RF, or the like, or any suitable combination of the foregoing.

Computer program code for carrying out operations for aspects of the present disclosure may be written in any combination of one or more programming languages, including an object-oriented programming language such as Java, Scala, Smalltalk, Eiffel, JADE, Emerald, C++, C #, VB.NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Furthermore, the recited order of processing elements or sequences, or the use of numbers, letters, or other designations therefore, is not intended to limit the claimed processes and methods to any order except as may be specified in the claims. Although the above disclosure discusses through various examples what is currently considered to be a variety of useful embodiments of the disclosure, it is to be understood that such detail is solely for that purpose, and that the appended claims are not limited to the disclosed embodiments, but, on the contrary, are intended to cover modifications and equivalent arrangements that are within the spirit and scope of the disclosed embodiments. For example, although the implementation of various components described above may be embodied in a hardware device, it may also be implemented as a software only solution, e.g., an installation on an existing server or mobile device.

Similarly, it should be appreciated that in the foregoing description of embodiments of the present disclosure, various features are sometimes grouped together in a single embodiment, figure, or description thereof for the purpose of streamlining the disclosure aiding in the understanding of one or more of the various embodiments. This method of disclosure, however, is not to be interpreted as reflecting an intention that the claimed subject matter requires more features than are expressly recited in each claim. Rather, claimed subject matter may lie in less than all features of a single foregoing disclosed embodiment.

We claim:

1. A system for updating and loading an application installed in a mobile device, comprising:
   at least one non-transitory computer-readable medium storing a set of instructions for updating and loading an application installed in a mobile device; and
   at least one processor configured to communicate with the at least one non-transitory computer-readable medium, wherein, when executing the set of instructions, the at least one processor is directed to:

transmit an update notice of the application to the mobile device, wherein the application includes a shell and a pre-update plugin, and wherein the shell includes a plugin engine; and provide a resource installation package to the mobile device upon a response from the mobile device to the update notice of the application, wherein the resource installation package is configured to direct the application to use the plugin engine in the shell to utilize components of the resource installation package to update the pre-update plugin;

wherein to use the plugin engine in the shell to utilize components of the resource installation package to update the pre-update plugin, the resource installation package is further configured to direct the application to:

receive a pre-update resource bundle in the pre-update plugin, wherein the pre-update resource bundle has a bundle ID, a resource type, and a resource number;

identify a corresponding update resource bundle in the resource installation package, wherein the corresponding update resource bundle has a same resource type and a same resource number as the pre-update resource bundle;

modify a bundle ID of the corresponding update resource bundle to be the same as the bundle ID of the pre-update resource bundle; and integrate the corresponding update resource bundle whose bundle ID is modified into the application.

2. The system of claim 1, wherein the resource installation package is further configured to direct the application to:

use the plugin engine to intercept activating the pre-update plugin;

direct a uniform resource identifier (URI) of the pre-update plugin to a URI of a proxy plugin;

store the URI of the pre-update plugin in the URI of the proxy plugin;

parse the URI of the pre-update plugin in the proxy plugin; and create an updated plugin based on the parsed URI of the pre-update plugin.

3. The system of claim 2, wherein the resource installation package is further configured to direct the application to:

receive an external request from a user;

transmit the external request to the updated plugin via the proxy plugin;

determine a response to the external request;

transmit the response to the proxy plugin via the updated plugin; and present the response to the external request via the proxy plugin.

4. The system of claim 3, wherein the resource installation package is further configured to direct the application to:

invoke a lifecycle of the updated plugin in a user interface thread.

5. The system of claim 1, wherein the at least one processor is further directed to:

create the resource installation package, wherein the resource installation package includes at least one update resource bundle.

6. The system of claim 5, wherein each update resource bundle includes a bundle ID, a resource type, and a resource number.

7. A method for updating and loading an application installed in a mobile device, comprising:

transmitting an update notice of the application to the mobile device, wherein the application includes a shell and a pre-update plugin, and wherein the shell includes a plugin engine; and providing a resource installation package to the mobile device upon a response from the mobile device to the update notice of the application, wherein the resource installation package is configured to direct the application to use the plugin engine in the shell to utilize components of the resource installation package to update the pre-update plugin;

wherein to use the plugin engine in the shell to utilize components of the resource installation package to update the pre-update plugin, the resource installation package is further configured to direct the application to:

receive a pre-update resource bundle in the pre-update plugin, wherein the pre-update resource bundle has a bundle ID, a resource type, and a resource number;

identify a corresponding update resource bundle in the resource installation package, wherein the corresponding update resource bundle has a same resource type and a same resource number as the pre-update resource bundle;

modify a bundle ID of the corresponding update resource bundle to be the same as the bundle ID of the pre-update resource bundle; and integrate the corresponding update resource bundle whose bundle ID is modified into the application.

8. The method of claim 7, wherein the resource installation package is further configured to direct the application to:

use the plugin engine to intercept activating the pre-update plugin;

direct a uniform resource identifier (URI) of the pre-update plugin to a URI of a proxy plugin;

store the URI of the pre-update plugin in the URI of the proxy plugin;

parse the URI of the pre-update plugin in the proxy plugin; and create an updated plugin based on the parsed URI of the pre-update plugin.

9. The method of claim 8, wherein the resource installation package is further configured to direct the application to:

receive an external request from a user;

transmit the external request to the updated plugin via the proxy plugin;

determine a response to the external request;

transmit the response to the proxy plugin via the updated plugin; and present the response to the external request via the proxy plugin.

10. The method of claim 9, wherein the resource installation package is further configured to direct the application to:

invoke a lifecycle of the updated plugin in a user interface thread.

11. The method of claim 7, further comprising:

creating the resource installation package, wherein the resource installation package includes at least one update resource bundle.

12. The method of claim 11, wherein each update resource bundle includes a bundle ID, a resource type, and a resource number.

13. A non-transitory computer-readable medium storing at least one set of instructions for updating and loading an application installed in a mobile device, wherein, when executed by at least one processor of a computer device, the at least one set of instructions directs the at least one processor of the computer device to:

transmit an update notice of the application to the mobile device, wherein the application includes a shell and a pre-update plugin, and wherein the shell includes a plugin engine; and provide a resource installation package to the mobile device upon a response from the mobile device to the update notice of the application, wherein the resource installation package is configured to direct the application to use the plugin engine in the shell to utilize components of the resource installation package to update the pre-update plugin;

wherein to use the plugin engine in the shell to utilize components of the resource installation package to update the pre-update plugin, the resource installation package is further configured to direct the application to:

receive a pre-update resource bundle in the pre-update plugin, wherein the pre-update resource bundle has a bundle ID, a resource type, and a resource number;

identify a corresponding update resource bundle in the resource installation package, wherein the corresponding update resource bundle has a same resource type and a same resource number as the pre-update resource bundle;

modify a bundle ID of the corresponding update resource bundle to be the same as the bundle ID of the pre-update resource bundle; and integrate the corresponding update resource bundle whose bundle ID is modified into the application.

14. The non-transitory computer-readable medium of claim 13, wherein the resource installation package is further configured to direct the application to:

use the plugin engine to intercept activating the pre-update plugin;

direct a uniform resource identifier (URI) of the pre-update plugin to a URI of a proxy plugin;

store the URI of the pre-update plugin in the URI of the proxy plugin;

parse the URI of the pre-update plugin in the proxy plugin; and create an updated plugin based on the parsed URI of the pre-update plugin.

15. The non-transitory computer-readable medium of claim 14, wherein the resource installation package is further configured to direct the application to:

receive an external request from a user;

transmit the external request to the updated plugin via the proxy plugin;

determine a response to the external request;

transmit the response to the proxy plugin via the updated plugin; and present the response to the external request via the proxy plugin.

16. The non-transitory computer-readable medium of claim 15, wherein the resource installation package is further configured to direct the application to:

invoke a lifecycle of the updated plugin in a user interface thread.

17. The non-transitory computer-readable medium of claim 13, wherein, when executed by at least one processor of a computer device, the at least one set of instructions further directs the at least one processor of the computer device to:

create the resource installation package, wherein the resource installation package includes at least one update resource bundle.

\* \* \* \* \*